(No Model.)
N. A. TANNER.
MEAT POUNDER.
No. 442,151. Patented Dec. 9, 1890.
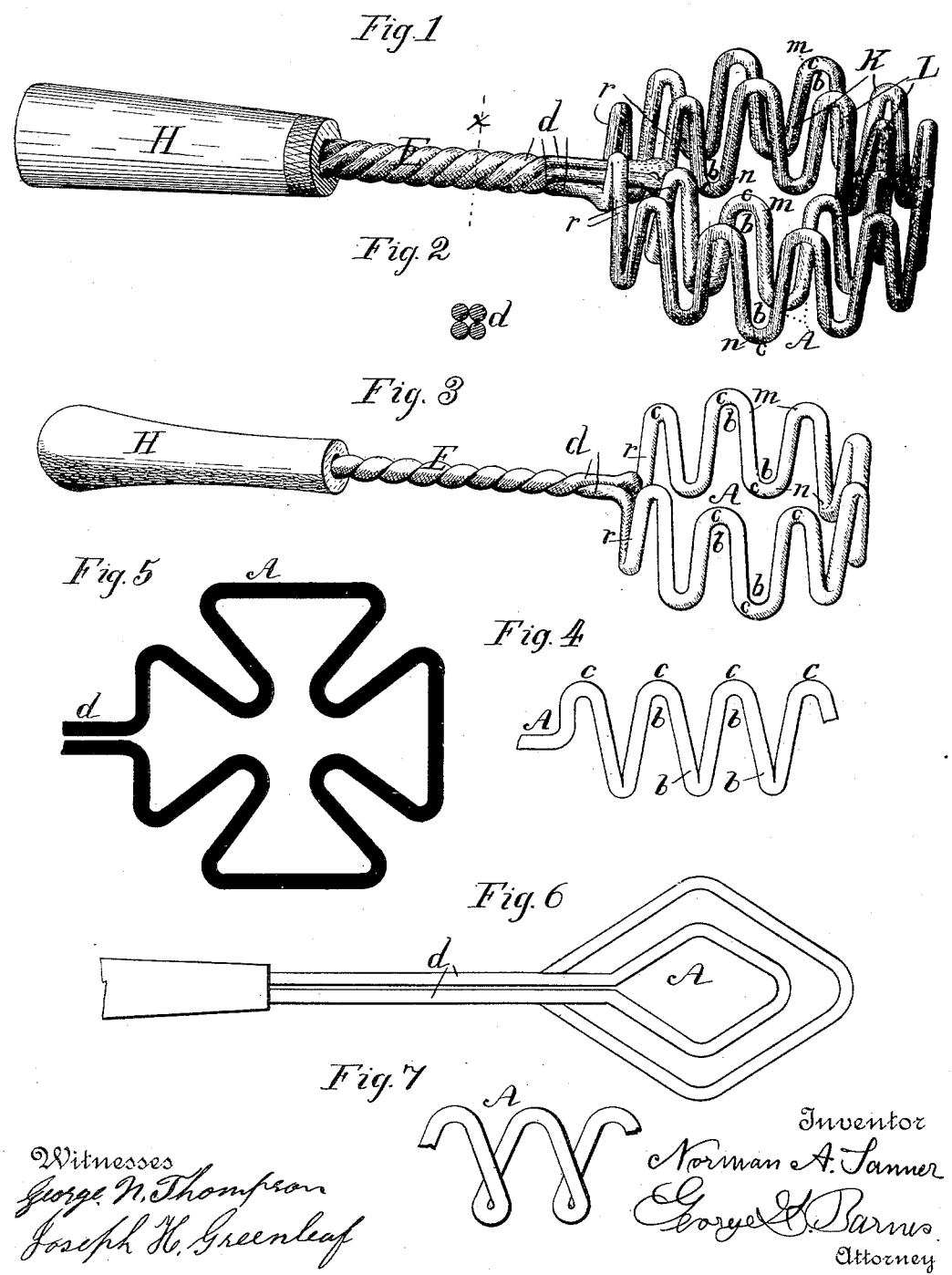

UNITED STATES PATENT OFFICE.

NORMAN A. TANNER, OF NEW HAVEN, CONNECTICUT.

MEAT-POUNDER.

SPECIFICATION forming part of Letters Patent No. 442,151, dated December 9, 1890.

Application filed March 25, 1890. Serial No. 345,206. (No model.)

*To all whom it may concern:*

Be it known that I, NORMAN A. TANNER, a citizen of the United States, residing at New Haven, in the county of New Haven and State of Connecticut, have invented certain new and useful Improvements in Meat-Pounders, of which the following is a specification.

My invention has for its object to provide a meat pounder or implement which shall be adapted to thoroughly break up or soften the fiber of steak without excessive laceration thereof, and of a configuration that is of neat and inexpensive design and that will permit of being readily and perfectly cleaned after use.

The invention consists in the novel construction of the implement as formed of a wire, metal rod, or strip bent into a zigzag form or successive folds, convolutions, or reciprocal bends, to provide a series of blunt and rounded operating-points, as hereinafter more particularly described and claimed.

In the accompanying drawings, forming a part of this specification, Figure 1 is a perspective view of the implement formed of multiple wires instead of a single strand; and Fig. 2 is a sectional view on the line $x$, Fig. 1. Fig. 3 is a perspective view of the implement formed of a single wire instead of multiple strands. Fig. 4 is a side elevation of a part of a row of folds, having opposite series of bends of different degrees of bluntness. Figs. 5 and 6 show modifications of the form of the row or plane in which the series of folds may be arranged, and Fig. 7 represents a portion of wire bent into a series of coils or convolutions, instead of zigzag folds.

Referring to the drawings, my improved meat-pounder is shown to consist of wire or metal rod A, preferably round in cross-section, bent into a zigzag or recipro-curvate form or successive folds, convolutions, or reciprocal bends $b$ to provide a series of blunt or rounded points $c$, which are adapted for breaking up and softening the fiber of the meat without excessive laceration and mutilation thereof. The folds are formed in regular and reciprocal succession and equidistant from each other, thus presenting two opposite series $m$ $n$ of points $c$, respectively on opposite sides of the implement, and either of which are adapted to be brought into use, according as the implement is held in operation. The folds are arranged in a row or plane that may be of circular or any other desired form, and the terminal folds $r$ $r$ in the series are arranged or brought around nearly into juxtaposition, and the end portions $d$ of the wire are then bent off radial to the circle of folds and parallel with and about equidistant between the flat plane of the points $c$, and preferably twisted firmly together and inserted or otherwise secured in a suitable handle H, by which the implement may be grasped. It will be obvious that the said parts $d$ of the wire may be left untwisted, as shown in Fig. 6, but the shank E, formed by twisting the wires, as shown in Figs. 1 and 3, is the strongest and preferred construction.

In each series of folds the points $c$ are arranged in substantially the same flat plane, as fully shown in Fig. 4, and adapted to bear or strike simultaneously upon the meat, which will ordinarily rest upon a flat or level surface while in process of being beaten or "whipped" with the implement. Either series of points—that is, the upper or lower—as shown in the drawings, may be used by simply turning the pounder over, and if it is desired to combine different varieties of points in a single implement the bends in one series may be made somewhat sharper than in the opposite series, as shown in Fig. 4, so that by reversing or turning the pounder over a differently-proportioned set of points may be brought into action, as required. If the series of folds is disposed in a circular plane, or any other symmetrical shape which is practically an inclosure, two or more wires formed in rows or planes of different diameters and placed one within the other may be used, as shown in Figs. 1 and 6, the ends of the wires all being brought together and twisted in a single shank or left straight, as required. This construction is preferable if a heavy pounder is wanted, and the points $c$ of like bends in both rows of folds K L, Fig. 1, are arranged in the same flat plane, K representing the outer and L the inner row of folds, each formed of separate wires having their four end portions twisted in a single and exceedingly strong shank; but if a light pounder is required a single wire only may be used, bent into a circular series of folds, as shown in Fig.

3. A heavy pounder, however, may be formed of a single wire by arranging the folds in a row or plane having a sufficiently-extended perimeter—as, for instance, a form having the general shape of a Maltese cross, as shown in Fig. 5, which provides a long outline, though consisting of but a single wire.

It will be seen that instead of bending the wire into zigzag form it may be bent into a series of coils or convolutions, as shown in Fig. 7, the object in either case being to provide a series of points in the same flat plane which are adapted to serve as blunt teeth or surfaces for breaking up the fibers of the meat by being struck thereon.

In the construction of the implement I first bend the wire into a straight series of folds, as shown in Fig. 4, and then bend the series around a cylinder or former having the shape desired. The folds may be formed in the wire by bending it over a series of pins, which are inserted in a zigzag row in a metal table or block and correspond to the series of bends which it is desired to form in the wire.

This improved meat-pounder is of neat design and very strong and durable. As it may be formed of wire, which is easily bent into the shape described, it is inexpensive and when made of plated wire cannot rust, but may be readily kept clean and neat, and is very effective in operation.

I therefore claim—

1. A meat-pounder consisting of a rod or wire strand bent zigzag or in alternate folds or bends to provide opposite series of operating-points and having the said folds arranged in cylindrical or other inclosed form, with each series of points in a flat plane horizontal to the sides of the inclosure and the ends or terminal parts of the wire extended to form a shank and inserted or secured in a suitable handle, as and for the purpose specified.

2. A meat-pounder consisting of a rod or wire strand bent zigzag or in alternate folds or bends to provide opposite series of operating-points and having the said folds arranged in cylindrical or other inclosed form, with each series of points in a flat plane horizontal to the sides of the inclosure and the ends or terminal parts of the wire extended and twisted into a shank and inserted or secured in a suitable handle, as and for the purpose specified.

3. A meat-pounder consisting of rods or wire strands, each bent zigzag or in alternate folds or bends to provide opposite series of operating-points and having the said folds arranged in cylindrical or other inclosed form, with each series of points in a flat plane horizontal to the sides of the inclosure, the said cylindrical or other shaped inclosed rows of folds being of different diameters and arranged one within the other, with all the points of corresponding series in the same flat plane and parallel to the opposite series, and the ends of the wires being twisted into a shank and secured in a suitable handle, as and for the purpose specified.

NORMAN A. TANNER.

Witnesses:
JAMES M. EVARTS,
JOSEPH H. GREENLEAF.